United States Patent [19]
Dassanayake et al.

[11] Patent Number: 5,550,716
[45] Date of Patent: Aug. 27, 1996

[54] REDUCED PACKAGE DEPTH LOW PROFILE HEADLAMP

[75] Inventors: Mahendra S. Dassanayake, Farmington Hills; Jeffrey A. Erion, Plymouth, both of Mich.

[73] Assignee: Ford Motor Company, Dearborn, Mich.

[21] Appl. No.: 342,065

[22] Filed: Nov. 18, 1994

[51] Int. Cl.[6] .................. F21V 8/00; B60Q 1/00
[52] U.S. Cl. .............. 362/32; 362/61; 362/335; 362/80; 359/718.
[58] Field of Search ................. 359/365, 664, 359/712, 884, 708, 709, 718, 721; 312/80, 61, 355, 362, 335, 32, 332

[56] References Cited

U.S. PATENT DOCUMENTS

| | | | |
|---|---|---|---|
| 1,422,307 | 7/1922 | Salto | 359/718 X |
| 2,254,961 | 9/1941 | Harris | 359/719 X |
| 2,530,397 | 11/1950 | Merte | 359/718 |
| 3,781,097 | 12/1973 | Bechtold | 359/718 |
| 4,609,978 | 9/1986 | Hsich et al. | 362/335 |
| 4,655,555 | 4/1987 | Mächler et al. | 359/664 |
| 4,811,172 | 3/1989 | Davenport et al. | 362/61 |
| 4,868,718 | 9/1989 | Davenport et al. | 362/32 |
| 4,949,227 | 8/1990 | Finch et al. | 362/61 |
| 4,952,022 | 8/1990 | Genovese | 362/32 X |
| 4,958,263 | 9/1990 | Davenport et al. | 362/32 |
| 4,964,692 | 10/1990 | Prescott | 362/32 |
| 5,014,273 | 5/1992 | Lindae et al. | 302/335 X |
| 5,184,882 | 2/1993 | Davenport et al. | 362/32 |
| 5,217,290 | 6/1993 | Windross | 362/32 |
| 5,222,793 | 6/1993 | Davenport et al. | 362/32 |
| 5,257,168 | 10/1993 | Davenport et al. | 362/32 |
| 5,268,977 | 12/1993 | Miller | 362/32 X |
| 5,295,047 | 3/1994 | Windross | 362/26 |
| 5,311,410 | 5/1994 | Hsu et al. | 362/32 X |

*Primary Examiner*—Denise L. Gromada
*Assistant Examiner*—Thomas M. Sembler
*Attorney, Agent, or Firm*—Kevin G. Mierzwa

[57] ABSTRACT

A reduced package depth low profile headlamp includes a light source emitting light in an elongated shape with a length longer than a width. The length forms a predetermined angle with respect to the horizontal axis to generate light within predetermined a cutoff. A converging lens receiving light from the light source has an optical axis. The lens has a spherical inner surface with a center and an elliptical outer surface having a first and second focal point. The light source is positioned substantially on the optical axis so that the light source is substantially at the center of the spherical inner surface and the first focal point of the elliptical outer surface is substantially coincident with the center of the spherical inner surface.

10 Claims, 2 Drawing Sheets

REDUCED PACKAGE DEPTH LOW PROFILE HEADLAMP

BACKGROUND OF THE INVENTION

The present invention relates to a forward lighting system for an automotive vehicle and, more specifically to an improved forward lighting system having a relatively small package height and depth.

Light distribution systems employing fiber optic cables for vehicle forward lighting are generally known in the art. The light distribution patterns of such forward lighting systems must both ensure that adequate lighting is provided for the vehicle operator while minimizing visual interference with other drivers. Standards are set for cutoffs in front of the automobile above which light from a forward lighting system should not travel so as to avoid dazzling other drivers.

One such system uses round fiber optic bundles connected to a motor which moves the fiber optic bundles in relation to a fixed lens to create the high beam and low beam patterns of the forward image. Such a design occupies considerable space at the front of the vehicle. Yet another disadvantage of that system is that it employs moving parts that may cause reliability problems in commercial high production applications.

It would therefore be advantageous to provide a system for forward lighting which has a relatively small package depth and package height while providing acceptable beam patterns without moving parts.

SUMMARY OF THE INVENTION

One object of the invention is to advantageously provide a reduced package size forward lighting system with a good beam pattern.

The present invention includes a light source emitting light in an elongated shape with a length longer than the width. The length forms a predetermined angle with respect to the horizontal axis to generate light within predetermined a cutoff. A converging lens receiving light from the light source has an optical axis. The lens has a spherical inner surface with a center and an elliptical outer surface having a first and second focal point. The light source is positioned substantially on the optical axis so that the light source is substantially at the center of the spherical inner surface. The first focal point of the elliptical outer surface is substantially coincident with the center of the spherical inner surface.

DETAILED DESCRIPTION OF THE PREFERRED EMBODIMENT

Figure 1:
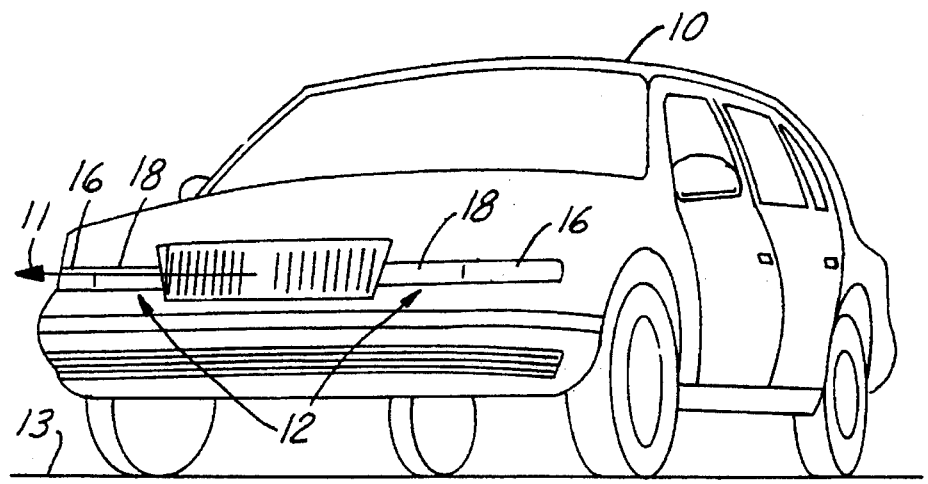
FIG. 1 is a perspective of an automobile having a forward lighting system according to the present invention.

Referring now to FIG. 1, the front of an automotive vehicle 10 with a longitudinal axis 11 has a forward lighting system 12 that is used for both the high beam applications and low beam applications. Automotive vehicle 10 is placed upon a horizontal plane 13 representative of a road surface. Lights 16 comprise the low beams. Lights 18 comprise the high beams.

Figure 2:
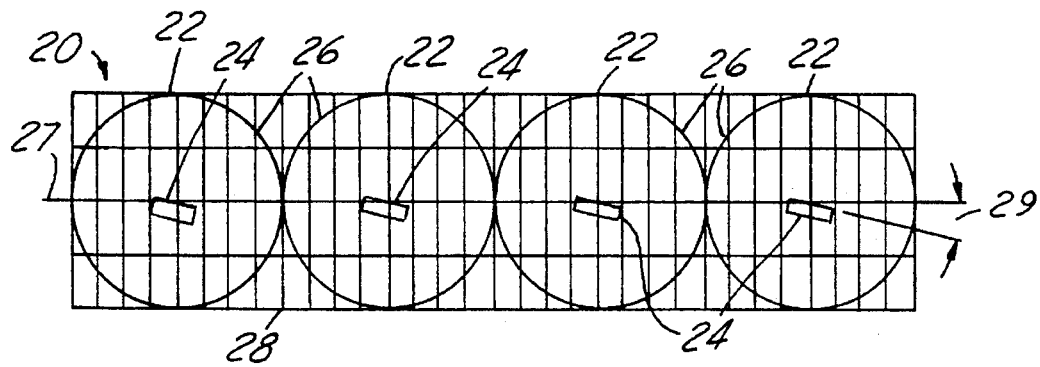
FIG. 2 is a front view of a light distributor according to the present invention.

Referring now to FIG. 2, forward lighting system 12 is described with reference to one lighting unit 20. A lighting unit 20 may be comprised of several individual identical segments 22 which together provide the desired light output. For example, in providing a light output of 400 lumens, four 100 lumen segments are placed in a lighting unit 20. As shown, the segments are placed side by side. However, several configurations may be used depending on the design requirements of the individual application. The dimensions of lighting unit 20 are about 40 mm high by 160 mm wide. The 40 mm height is very low compared to prior art forward lighting and allows automobile designers more flexibility in the front end design of an automotive vehicle.

An individual lighting unit 20 is comprised of a light emitter 24 in a fixed relation to a converging lens 26 and a diffusing lens 28. Light emitter 24 is preferably planar and rectangular in shape to improve the desired cutoffs. Light emitter 24 in the preferred embodiment is 5 mm along the long axis and 2 mm wide. Light emitter 24 is shown as a light pipe. However, light emitter 24 can also be a number of different types of light sources including a bundle of light pipes, an arc discharge lamp or incandescent bulb each of which can be obtained having the light emission portion of similar dimensions. Also facilitating compliance with cut offs is the angle 29 between the long axis of light emitter 24 and a horizontal axis 27. Angle 29 was found to give the most distinct cutoffs at about 12° from horizontal axis 27.

Figure 3:
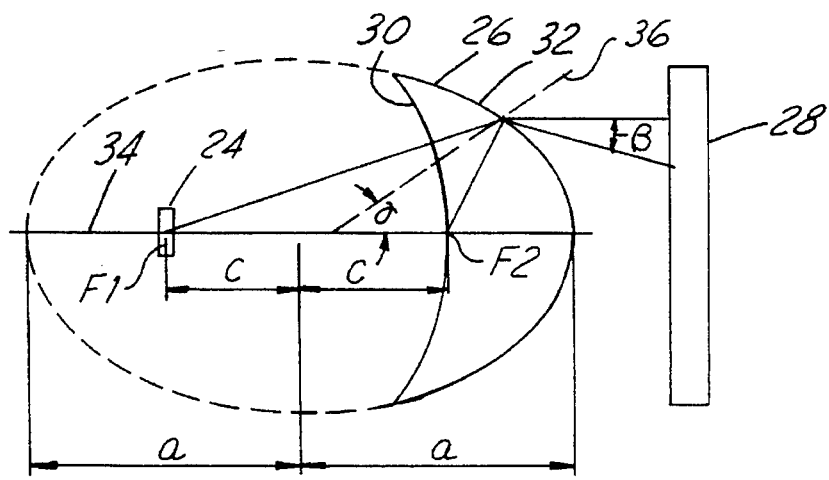
FIG. 3 is a diagrammatical view of the relationship of the light source and the lenses.

Referring now to FIG. 3, an individual segment of the individual lighting unit is shown. Converging lens 26 has an inner surface 30 and an outer surface 32. Outer surface 32 is elliptical in shape having a first focal point F1 and a second focal point F2 located on a longitudinal axis 34. Inner surface 30 is spherical with a radius centered at F1 and a length equal to the distance between F1 and F2. From the above geometry, it follows that the inner surface 30 intersects F2. Light emitter 24 is located at point F1.

Converging lens 26 has the above mentioned shape to increase light transference. When light emitter 24 is located at the center of inner surface 30, all the light incident on converging lens 26 is transferred into converging lens 26 since the light incident on the surface is perpendicular to a tangent (not shown) on inner surface 30. The greater the angle of light incident on the face is from a normal to the surface, the lesser the amount of light transferred into the surface. Therefore, the preferred shape of inner surface 30 is a sphere having a light source at its center.

The distance between the two focal points is 2c. Half the length of the major axis of ellipse is the length a. Converging lens 26 is preferably made of glass or plastic having an index of refraction (n) of about 1.5. The light output deviation angle (β) from longitudinal axis 34 is related to the shape of the lens by the formula:

$$\beta = \sin^{-1}\left[\frac{cn}{a}\sin\alpha\right] - \alpha$$

where the angle α is the angle between a local normal 36 to the outer surface 32 of converging lens 26 and longitudinal axis 34. It follows from the formula that if the ratio a/c is equal to the refractive index that the light will be collimated parallel to longitudinal axis 34. This alone is undesirable in a forward lighting system since a slight downward angle is needed to illuminate the road surface in front of the automobile. Because of this geometry, smaller and brighter images are located closer to longitudinal axis 34 whereas larger dimmer images are located further from longitudinal axis 34. This is also critical in the design of forward lighting systems because a predetermined beam pattern is desired and having a brighter image located close to longitudinal axis 34 facilitates beam control.

Diffusing lens 28 is used if a proper β angle cannot be achieved to create the required light cutoff and spread of light. As can be best seen in FIG. 2; the diffusion lens has several segments. Each of the segments have a slight radius. For example, the top and bottom rows of segments in FIG. 2 have 4 mm radii, whereas the middle two rows have a radius of 50 mm. The radii are adjusted based on the road illumination requirements for the specific vehicle application.

Figure 4:
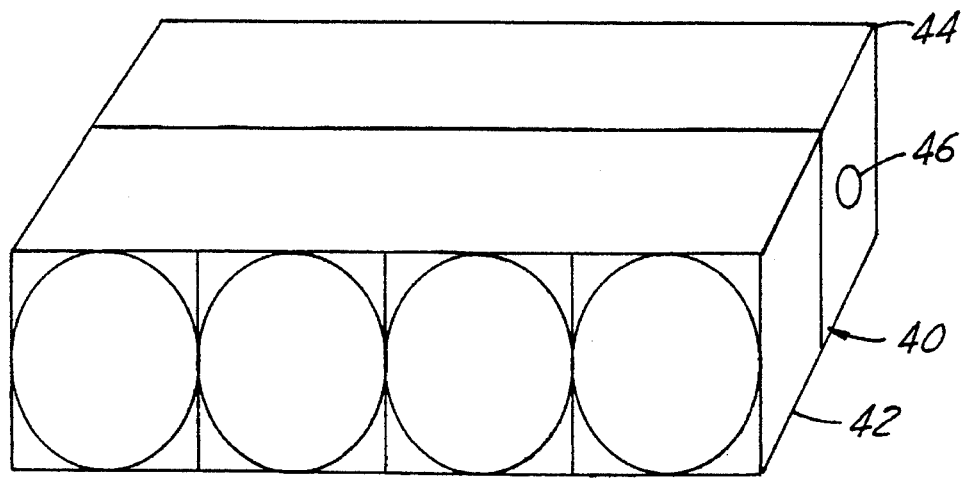
FIG. 4 is a perspective view of the converging lens in relation to the housing.

Referring now to FIG. 4, a housing 40 containing an individual lighting unit 20 is shown having two portions, a front housing 42 and a back housing 44. Front housing 42 secures converging lens 26 and diffusing lens 28 and in a fixed relationship to the light distributor secured by housing 44 through locating hole 46.

Figure 5:
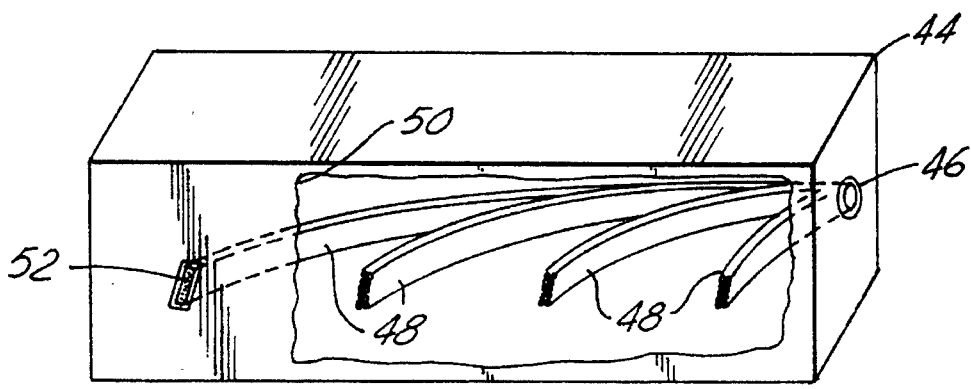
FIG. 5 is a cut-away view of the housing showing the light distribution.

As shown in FIG. 5, a bundle of fiber optic cables 48 are bunched together in the number of segments required. The bundles are fixed relative to housing 44 in their desired shape. A mask 50 having an opening 52 in the desired shape is used to hold light pipes in place. Mask 50 also can be used as a screen if an incandescent bulb with a reflector is the desired light source. If the bulb is mounted in back housing 44, mask 50 can provide a light opening to achieve the desired light emitter size.

Figure 6:
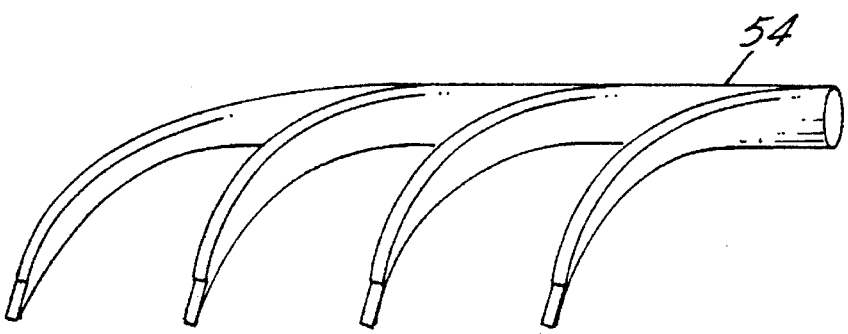
FIG. 6 is a perspective view of a solid light distributor.

Referring now to FIG. 6, a single solid light distributor 54 is shown. The ends of the solid light distributor are formed in the same shape as described above with the light pipes. The light distributor is made from any common light transmitting material such as acrylic.

Various modifications will be apparent to those skilled in the art. For example, different arrangement of lighting segments may be employed. All such modifications would be within the scope of this invention.

What is claimed is:

1. A forward lighting system for an automotive vehicle having a longitudinal axis parallel to a horizontal road plane, said lighting system comprising:

an elongated light source for emitting light in a direction substantially parallel to said longitudinal axis, said light source having a length longer than a width, said length forming a predetermined angle with respect to said horizontal road plane;

a converging lens having a spherical inner surface and an elliptical outer surface, said elliptical outer surface having a first and second focal point, said light source located at the first focal point, said radius of said spherical lens having a length equal to the distance between the first and second focal point, said spherical lens centered at said first focal point; and a diffusion lens adjacent said elliptical outer surface of said converging lens.

2. A forward lighting system as claimed in claim 1 wherein said emitter comprises a light pipe, said light pipe having a generally planar face perpendicular to the road plane and normal to the longitudinal axis of said automobile.

3. A forward lighting system as claimed in claim 1 wherein the light source comprises a mask, said mask positioned between the light source and said converging lens, said mask having rectangular opening with a longitudinal axis forming a predetermined angle with respect to the road plane.

4. A forward lighting system as claimed in claim 1 wherein the light source comprises a light source having elongated filament forming predetermined angle with respect to the road plane.

5. A forward lighting system as claimed in claim 1 wherein said light source comprises a solid light distributor having rectangular ports with a longitudinal axis forming a predetermined angle with respect to the road plane.

6. A forward lighting system for an automotive vehicle having a longitudinal axis parallel to a horizontal road plane, said lighting system comprising:

a housing;

a plurality of light sources fixed within said housing for emitting light in a direction substantially parallel to the longitudinal axis of said automotive vehicle, said light source having a length longer than a width, said length forming a predetermined angle with respect to said road plane; and a plurality converging lenses, each light source having a corresponding lens fixed with the housing, each of said lenses having a spherical inner surface and an elliptical outer surface, said elliptical outer surface having a first and second focal point, said light source located at the first focal point, said radius of said spherical lens having a length equal to the distance between the first and second focal point, said spherical lens centered at said first focal point, said inner surface positioned adjacent said light source, said outer surface positioned adjacent said inner surface opposite said light sources.

7. A forward lighting system as claimed in claim 6 further comprising a diffusion lens adjacent said elliptical outer surface of said each converging lens.

8. A forward lighting system as claimed in claim 6 wherein said each light source comprises a light pipe, said light pipe having a generally planar face perpendicular to the road plane and normal to the longitudinal axis of said automobile.

9. A forward lighting system as claimed in claim 6 wherein said each light source comprises a mask positioned between said light source and said converging lens, said mask having rectangular opening.

10. A forward lighting system as claimed in claim 6 wherein said each light source comprises an elongated filament forming a predetermined angle with respect to the road plane.

\* \* \* \* \*